UNITED STATES PATENT OFFICE 2,646,429

MANUFACTURE OF CELLULOSE ACETATE WITH SULFOACETIC PRETREATMENT

Carl J. Malm and Loring W. Blanchard, Jr., Rochester, N. Y., assignors to Eastman Kodak Company, Rochester, N. Y., a corporation of New Jersey No Drawing. Application June 8, 1951, Serial No. 230,698

11 Claims. (Cl. 260—229)

The present invention relates to a method for the manufacture of cellulose esters, particularly cellulose acetate, involving the use of sulfoacetic acid in the pretreatment of the cellulose.

Cellulose acetate is commonly prepared by subjecting cellulose to a pretreatment with an acetic acid solution of sulfuric acid to partially break down the viscosity of the cellulose before the acetylation. Preferably, in such an operation it is desirable to first preswell the cellulose, such as by soaking it in acetic acid, this presoaking with acetic acid having the effect of more uniform action upon the cellulose by the pretreatment operation. The pretreatment of the cellulose is facilitated if prior to the soaking of the cellulose in acetic acid it has a substantial moisture content. For instance, good results are obtained if the cellulose which is to be esterified is not dried to a moisture content below 5 percent. In other cases, cellulose, such as in the form of a fibrous pad or sheet, is first subjected to the action of water, such as by drawing water through the sheet, followed by de-watering thereof with glacial acetic acid to maintain the swollen condition, a treatment with an acetic acid solution of sulfuric acid is usually employed, whereupon the mass is cooled. Acetic anhydride is then added, which anhydride reacts with any water which may be present, thereby generating heat. The mixture is again cooled and the bulk of the esterification catalyst is then added.

In the pretreatments of the type described above, about 75 percent of the sulfuric acid employed in the pretreatment operation is absorbed by the cellulose fibers, the fibers being selective as regards the sulfuric acid. Thus, if the amount of sulfuric acid which is added in the pretreatment liquid is 1 percent of the weight of the cellulose, the greater part of this sulfuric acid is absorbed by the cellulose fibers. The next step after the pretreatment of the cellulose is to add acetic anhydride to the mass, which mainly acts to destroy the water which may be present. It has been observed that upon the addition of acetic anhydride to the mass, the small amount of sulfuric acid present becomes absorbed 100 percent by the cellulose.

Upon the addition of the acetic anhydride, any water which may be present in the mass combines therewith to form acetic acid. This action results in the generation of some heat, and may, where sulfuric acid is present, even cause some esterification of the cellulose to take place.

When the described process is employed in large scale production equipment, a decided rise in temperature may occur upon contacting acetic anhydride with the water present in the presence of the catalyst, in which case the process may go out of control. Also, as fluctuations in the moisture content of the cellulose may be met with from one case to the next, normal conditions with one batch may become abnormal with another batch.

One object of our invention is to provide a process for the preparation of cellulose esters in which the temperature control in the preparation of the cellulose for its esterification is facilitated. Another object of our invention is to provide a method for preparing cellulose esters in which the time cycle may be shortened. A further object of our invention is to provide a process in which products of good uniformity are obtained. Other objects of our invention will appear herein.

We have found that if sulfoacetic acid instead of sulfuric acid is employed as the catalyst in the pretreatment of cellulose under the conditions prescribed therein, difficulties which have been encountered in previous methods for the esterification of cellulose are avoided thereby. We have found that the action of sulfoacetic acid in the pretreatment is similar to that of sulfuric acid, but that the sulfoacetic acid will only catalyze the reaction between the water and acetic anhydride without promoting the esterification of the cellulose. This eliminates the danger of acetylation during the water reaction and gives good control of this reaction.

The cellulose ester prepared in accordance with our invention may be any of the commonly known cellulose esters, such as cellulose acetate, cellulose acetate butyrate, cellulose acetate propionate, and the like. The cellulose which is employed as the starting material in such an acetylation process may be any of the grades of cellulose such as are commonly used in making cellulose esters, and may be a refined wood pulp or refined cotton linters.

Our invention involves first treating the cellulose in such a way that the fibers thereof are swollen, such as by a treatment of the cellulose with glacial acetic acid, or when with water, subsequently replacing the water in the cellulose with acetic acid. The cellulose, wet with acetic acid, is then treated with a mixture of acetic acid and a small proportion of sulfoacetic acid. Ordinarily, the proportion of sulfoacetic acid used will be found within the range of 1 to 5 percent, based on the weight of the cellulose, although it is possible to operate outside of these limits. After the cellulose has been pretreated with this mixture of acetic acid and sulfoacetic acid such as for one hour at 70 to 120° F., so as to obtain a cellulose of the desired viscosity, the mass is desirably cooled to 60 to 65° F., whereupon the acetic anhydride which is to be employed in the esterification is added. Whereas when sulfuric acid is employed, the addition of the acetic anhydride to the cellulose mass causes substantially 100 percent absorption of the sulfuric acid by the cellulose, in the case of the employment of sulfoacetic acid, the addition of acetic anhydride causes that acid to leave the cellulose fibers and be distributed throughout the acetic acid-acetic anhydride mixture, where it can catalyze the acetic anhydride-water reaction without causing any local overheating. Also, by proceeding in this manner, any esterification of the cellulose is avoided. This being the case, the temperature to which the mass is lowered at the time of the addition of the anhydride need not be nearly so low as has been found to be desirable in the case where sulfuric acid has been employed for the pretreatment catalyst. Also, by being away from the fibers, the sulfoacetic acid which is employed as the catalyst causes little if any breakdown of the cellulose during the reaction of the anhydride with the water, as distinguished from the case where sulfuric acid is used. After the mass is completely anhydrous by the complete reaction of the water with the anhydride, the mixture is cooled, such as to 10-60° F., whereupon the esterification catalyst may be added and the esterification proceeds under good and reproducible control. By the use of the sulfoacetic acid in the pretreatment, the cooling need not be as pronounced as in the use of sulfuric acid and the destruction of the water which is present in the mass may consume considerably less time than where sulfuric acid is employed as the pretreatment catalyst. Therefore, the addition of the amount of sulfuric acid which is to be employed for the esterification catalyst can take place at a much earlier point in the process than is the case where the sulfuric acid pretreatment is used. This results in a shortening of the acetylation cycle.

It has previously been disclosed that sulfoacetic acid may be employed as the esterification catalyst in the acetylation of cellulose, but in those cases sulfoacetic acid and sulfuric acid have been regarded as equivalent materials as regards the esterification, and no difference has been recognized as to their use. As a matter of fact, however, sulfoacetic acid being a very poor esterification catalyst requires when used to promote the esterification proper, either an excessive time or an elevated temperature, and therefore, in our invention it is desirable to add some more suitable esterification catalyst for the esterification portion of the process.

Sulfoacetic acid such as is employed as the pretreatment catalyst in accordance with our invention can be easily prepared, for example, by reacting 1.1 moles of acetic anhydride diluted with an equal weight of acetic acid with 1 mole of sulfuric acid at room temperature for 24 hours, followed by heating to 180° C. for a sufficient time that a sample of the mixture, when diluted with water, shows the absence of sulfuric acid upon testing with barium chloride. When this point is reached, the excess of acetic anhydride present is converted to acetic acid with a small amount of water. Instead of sulfoacetic acid, other sulfo fatty acids, such as sulfopropionate or sulfobutyric acid may be employed in pretreating cellulose in the manner outlined. If desired, a methane or ethane sulfonic acid might be employed in this connection; however, in view of the good characteristics of sulfoacetic acid for this purpose, this acid is preferred. Although the method of esterification which we have developed involving pretreatment with sulfo fatty acid and has been described primarily with reference to the manufacture of cellulose acetate, this method is also useful in the preparation of the other lower fatty acid esters of cellulose, particularly cellulose acetate butyrate and cellulose acetate propionate, such as where the cellulose is pretreated with acetic acid and then esterified using butyric or propionic anhydride or a mixture of one or both of these anhydrides with acetic anhydride. In our method of esterification, it is desirable to employ sulfuric acid itself as the esterification catalyst, this acid being generally recognized as the most useful for promoting the acetylation of cellulose in the manufacture of lower fatty acid esters thereof.

The following example illustrates the application of our invention to the manufacture of cellulose acetate:

Thirty pounds of acetylation grade cotton linters were mixed with 120 pounds of acetic acid in a Werner-Pfleiderer esterification mixer and the mass was allowed to stand for one hour at 100° F. A mixture of 60 pounds of acetic acid and 1,200 grams of acetic acid containing 23 percent sulfoacetic acid was then added to the mass. The mass was then cooled to 64° F. and 84 pounds of 97 percent acetic anhydride were added thereto. After the water present in the mass had reacted with the acetic anhydride, as evidenced by the rise in temperature, the mass was cooled to 50° F., whereupon a mixture of 540 cc. of sulfuric acid and 2 pounds of acetic acid was added, and the resulting reaction was allowed to proceed to a maximum temperature of 80° F., which temperature was maintained until the mass was free from grain and fibers, the cellulose dissolving completely in the esterification mixture. There was then added to the mass a mixture of 15 pounds of water, 75 pounds of acetic acid and 950 grams of magnesium carbonate having a temperature of 180° F. over a period of one hour. The cellulose acetate was then precipitated from the mass by pouring the mass into agitated 40 percent aqueous acetic acid. A cellulose acetate having an acetyl content of approximately 43.5 percent was obtained.

In another instance, the preparation of cellulose acetate was carried out as described except that magnesium carbonate was not added as in the preceding instance, and after the addition of the mixture of water and acetic acid referred to, the mass was allowed to stand at 100° F. for several hours, followed by precipitation. The resulting cellulose acetate obtained had an acetyl content of approximately 41.5 percent.

We claim:

1. A method of preparing cellulose esters of fatty acids of 2-4 carbon atoms which comprises activating the cellulose with acetic acid whereby the same is swollen and then treating the cellulose with a mixture of a lower fatty acid and a sulfo-lower fatty acid at 70°-120° F., cooling to 60°-65° F., adding acetic anhydride to the mass, whereby the water therein is destroyed, cooling the mass to 10°-60° F., and adding sulfuric acid esterification catalyst and allowing the reaction so induced to go to completion, the maximum temperature during the reaction not exceeding 100° F.

2. A method of preparing cellulose esters of fatty acids of 2-4 carbon atoms which comprises soaking cellulose in fibrous form with water and then replacing the water therein with acetic acid, treating the cellulose with a mixture of acetic acid and a sulfo-lower fatty acid at 70°–120° F., cooling the mass to 60°–65° F., adding acetic anhydride to the mass, whereby the water therein is destroyed, cooling the mass to 10°–60° F., adding sulfuric acid esterification catalyst and allowing the reaction so induced to go to completion at a temperature not exceeding 100° F.

3. A method of preparing cellulose esters of fatty acids of 2-4 carbon atoms which comprises soaking cellulose with acetic acid for approximately one hour at a temperature of about 100° F., treating the cellulose with a mixture of acetic acid and a sulfo-lower fatty acid at 70°–120° F., cooling to 60°–65° F., adding acetic anhydride to the mass, whereby the water therein is destroyed, cooling the mass to 10°–60° F., adding sulfuric acid esterification catalyst and allowing the reaction so induced to go to completion at a temperature not exceeding 100° F.

4. A method of preparing cellulose esters of fatty acids of 2-4 carbon atoms which comprises activating the cellulose with acetic acid whereby the same is swollen and then treating the cellulose with a mixture of a lower fatty acid and sulfoacetic acid at 70°–120° F., cooling to 60°–65° F., adding acetic anhydride to the mass, whereby the water therein is destroyed, cooling the mass to 10°–60° F., and adding sulfuric acid esterification catalyst and allowing the reaction so induced to go to completion, the maximum temperature during the reaction not exceeding 100° F.

5. A method of preparing cellulose esters of fatty acids of 2-4 carbon atoms which comprises soaking cellulose in fibrous form with water and then replacing the water therein with acetic acid, treating the cellulose with a mixture of acetic acid and sulfoacetic acid at 70°–120° F., cooling the mass to 60°–65° F., adding acetic anhydride to the mass, whereby the water therein is destroyed, cooling the mass to 10°–60° F., adding sulfuric acid esterification catalyst and allowing the reaction so induced to go to completion at a temperature not exceeding 100° F.

6. A method of preparing cellulose esters of fatty acids of 2-4 carbon atoms which comprises soaking cellulose with acetic acid for approximately one hour at a temperature of about 100° F., treating the cellulose with a mixture of acetic acid and sulfoacetic acid at 70°–120° F., cooling to 60°–65° F., adding acetic anhydride to the mass, whereby the water therein is destroyed, cooling the mass to 10°–60° F., adding sulfuric acid esterification catalyst and allowing the reaction so induced to go to completion at a temperature not exceeding 100° F.

7. A method of preparing cellulose acetate which comprises treating cellulose with acetic acid as the only acid, whereby the cellulose is swollen, activating the cellulose with a mixture of acetic acid and sulfoacetic acid as the only acids therein, at 70°–120° F., cooling to 60°–65° F., adding to the mass acetic anhydride as the only anhydride, whereby the water is destroyed, cooling the mass to 10°–60° F., adding sulfuric acid esterification catalyst and allowing the acetylation of the cellulose thereby induced to go to completion at a temperature not exceeding 100° F.

8. In the preparation of cellulose esters of fatty acids of 2-4 carbon atoms, the pretreatment steps which comprise mixing cellulose with acetic acid, whereby the cellulose is swollen, followed by treating the swollen cellulose with a mixture of acetic acid and sulfo-lower fatty acid at 70°–120° F.

9. In the preparation of cellulose esters of fatty acids of 2-4 carbon atoms, the pretreatment steps which comprise swelling the cellulose and retaining the swollen condition by keeping the swollen cellulose wet with acetic acid, then treating the swollen acetic acid-containing cellulose with a mixture of acetic acid and sulfoacetic acid at 70°–120° F. until a cellulose having the desired viscosity is obtained.

10. In the preparation of cellulose esters of fatty acids of 2-4 carbon atoms, the pretreatment of cellulose comprising the steps of soaking the cellulose with water, whereby the cellulose is swollen, replacing the water therein with acetic acid and then treating the cellulose with a mixture of acetic acid and sulfoacetic acid at a temperature of 70°–120° F.

11. In the preparation of cellulose esters of fatty acids of 2-4 carbon atoms, the pretreatment of cellulose comprising the steps of soaking the cellulose with acetic acid for approximately one hour at about 100° F., then treating the cellulose with a mixture of acetic acid and sulfoacetic acid at a temperature of 70°–100° F., until a cellulose having the desired viscosity is obtained.

CARL J. MALM.
LORING W. BLANCHARD, Jr.

References Cited in the file of this patent

UNITED STATES PATENTS

| Number | Name | Date |
|---|---|---|
| 2,096,977 | Richter | Oct. 26, 1937 |
| 2,391,569 | Heney et al. | Dec. 25, 1945 |

FOREIGN PATENTS

| Number | Country | Date |
|---|---|---|
| 399,508 | Great Britain | Oct. 5, 1932 |
| 491,583 | Great Britain | 1938 |